US012687657B2

(12) United States Patent
Jarrett et al.

(10) Patent No.: US 12,687,657 B2
(45) Date of Patent: Jul. 21, 2026

(54) LENS AND OVERMOLD METHOD OF MANUFACTURE

(71) Applicant: Banner Engineering Corp., Minneapolis, MN (US)

(72) Inventors: Nicholas Brett Jarrett, Saint Bonifacius, MN (US); Chunmei Kang, Plymouth, MN (US); Darin Wampler, Prior Lake, MN (US); David William Franke, Golden Valley, MN (US); Ryan Van Domelen, Saint Paul, MN (US)

(73) Assignee: Banner Engineering Corp., Minneapolis, MN (US)

( * ) Notice: Subject to any disclaimer, the term of this patent is extended or adjusted under 35 U.S.C. 154(b) by 174 days.

(21) Appl. No.: 18/381,025

(22) Filed: Oct. 17, 2023

(65) Prior Publication Data

US 2025/0123422 A1     Apr. 17, 2025

(51) Int. Cl.
*G02B 1/04*          (2006.01)
*B29D 11/00*          (2006.01)
*G02B 3/00*          (2006.01)

(52) U.S. Cl.
CPC ........ *G02B 1/041* (2013.01); *B29D 11/00403* (2013.01); *G02B 2003/0093* (2013.01)

(58) Field of Classification Search
CPC ............ G02B 1/041; G02B 2003/0093; B29D 11/00403
USPC ........................................................ 359/642
See application file for complete search history.

(56) References Cited

U.S. PATENT DOCUMENTS

| | | |
|---|---|---|
| 2003/0060878 A1 | 3/2003 | Shadduck |
| 2012/0170280 A1 | 7/2012 | Choquet et al. |
| 2013/0148363 A1 * | 6/2013 | Choquet .................. B60Q 1/04 |
| | | 362/335 |
| 2018/0159207 A1 | 6/2018 | Shurish et al. |
| 2021/0123787 A1 | 4/2021 | Welle et al. |
| 2022/0082426 A1 | 3/2022 | Wälde et al. |
| 2023/0064350 A1 | 3/2023 | Kang et al. |

FOREIGN PATENT DOCUMENTS

WO     2022/117349 A1     6/2022

OTHER PUBLICATIONS

Friel et al., "3D Printed Radar Lenses with Anti-Reflective Structures," Jun. 11, 2019, Designs, 11 pages.
International Patent Application No. PCT/US2024/051625, filed Oct. 16, 2024; International Search Report / Written Opinion issued Feb. 18, 2025; 19 pages.

* cited by examiner

*Primary Examiner* — William Choi
(74) *Attorney, Agent, or Firm* — Mueting Raasch Group

(57) ABSTRACT

Some embodiments of the technology disclosed herein relate to a lens assembly including a lens base and a lens fill. The less base is constructed of a first material and defines a lens interior surface and a plurality of ribs extending axially from the lens interior surface. The plurality of ribs define a plurality of cavities between the plurality of ribs. The lens fill is constructed of a second material and is located within the plurality of cavities. The first material includes a plastic and the second material includes a plastic.

19 Claims, 8 Drawing Sheets

LENS AND OVERMOLD METHOD OF MANUFACTURE

TECHNOLOGICAL FIELD

The present disclosure is generally related to lenses. More particularly, the present disclosure is related to lenses manufactured using a molding process.

BACKGROUND

There are many different types of lenses constructed from a variety of materials (e.g., plastic, ceramic, glass, etc.) in a variety of different ways (e.g., 3D printing, molding, etc.) and used for a variety of applications (e.g., imaging, magnification, signal transmission, etc.).

Lenses used in a variety of applications (e.g., related to radar and FDS devices) are generally small and thin (e.g., 5 mm thick or less). Manufacturing larger lenses can advantageously provide more powerful and/or focused signal beams, but such manufacturing can be difficult, at least because larger and thicker lenses can warp or sink as more material takes longer to set. In molding manufacturing processes, the lens needs to be cooled for longer to suitably cool and harden the lens. Machining larger lenses, on the other hand, can be faster and avoid warping, but can be much more costly.

SUMMARY

The current technology relates to lens that may advantageously be larger and thus provide more powerful and/or focused signal beams in a variety of applications. Furthermore, some examples of manufacturing the lens may advantageously use a minimum two-step overmolding process that reduces the time required to produce a lens and reduce the cost of manufacture while maintaining structural integrity of the lens.

Some embodiments of the current technology relate to a lens assembly. The lens assembly can include a lens base constructed of a first material. The lens base can define a lens interior surface and a plurality of ribs extending axially from the lens interior surface. The plurality of ribs can define a plurality of cavities between the plurality of ribs. The lens assembly can further include a lens fill constructed of a second material. The lens fill can be located within the plurality of cavities. The first material can include a plastic and the second material can include a plastic.

In some such embodiments, the lens base can include a convex lens. Additionally or alternatively, the lens base can include a flange extending laterally from the convex lens. Additionally or alternatively, the first material can define a first color and the second material can define a second color that is different from the first color. Additionally or alternatively, the lens base can define a lens thickness greater than or equal to 3 millimeters (mm) and less than or equal to 50 mm. Additionally or alternatively, each of the plurality of ribs can define a rib length. The rib length can be less than or equal to the lens thickness. Additionally or alternatively, the lens base can define a lens base wall thickness. The lens base wall thickness can be defined by the lens interior surface and a lens exterior surface. The lens base wall thickness can be less than or equal to 5 mm. Additionally or alternatively, each of the plurality of ribs can define a rib thickness. The rib thickness can be at least 25% of the lens base wall thickness. Additionally or alternatively, each of the plurality of ribs can taper from a rib first end proximate to the lens interior surface to a rib second end distal from the lens interior surface. Additionally or alternatively, the convex lens can be configured to transmit 60 GHz electromagnetic waves. Additionally or alternatively, the lens base can include a flange, and the flange can define at least one window.

Some embodiments of the current technology relate to a method of making a lens. The method can include molding a lens base. The lens base can have a lens interior surface and a plurality of ribs extending axially from the lens interior surface. The lens base can be molded using a first material. The plurality of ribs can define a plurality of cavities between the plurality of ribs. The method can further include molding a lens fill within the plurality of cavities using a second material.

In some such embodiments, molding the lens base can include molding a convex lens and a flange extending laterally from the convex lens. Additionally or alternatively, the first material can define a first color and the second material can define a second color that is different from the first color. Additionally or alternatively, molding the lens base can define a lens thickness. The lens thickness can be greater than or equal to 3 millimeters (mm) and less than or equal to 50 mm. Additionally or alternatively, each of the plurality of ribs can define a rib length. The rib length can be less than or equal to the lens thickness. Additionally or alternatively, molding the lens base can define a lens base wall thickness. The lens base wall thickness can be defined by the lens interior surface and a lens exterior surface. The lens base wall thickness can be less than or equal to 5 mm. Additionally or alternatively, each of the plurality of ribs can define a rib thickness. The rib thickness can be at least 25% of the lens base wall thickness. Additionally or alternatively, each of the plurality of ribs can taper from a rib first end proximate to the lens interior surface to a rib second end distal from the lens interior surface. Additionally or alternatively, the lens can be configured to transmit 60 GHz electromagnetic waves.

Some embodiments of the current technology relate to a radar lens system. The radar lens system can include a lens base constructed of a first material. The lens base can include a convex lens and a flange extending laterally from the convex lens. The convex lens can define a lens interior surface and a plurality of ribs extending axially from the lens interior surface. The plurality of ribs can define a plurality of cavities between the plurality of ribs. The radar lens system can include a lens fill constructed of a second material. The lens fill can be located within the plurality of cavities. The flange can define at least one window. The lens fill can extend across the at least one window.

In some such embodiments, the first material includes a plastic and the second material includes a plastic. Additionally or alternatively, the radar lens system includes a radar sensor located proximate a center of a base of the convex lens. Additionally or alternatively, the radar lens system includes a light emitting diode (LED). The LED can be located proximate the at least one window, and the lens fill can transmit light therethrough.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE DRAWINGS

The present technology may be more completely understood and appreciated in consideration of the following detailed description of various embodiments in connection with the accompanying drawings.

Figure 1:
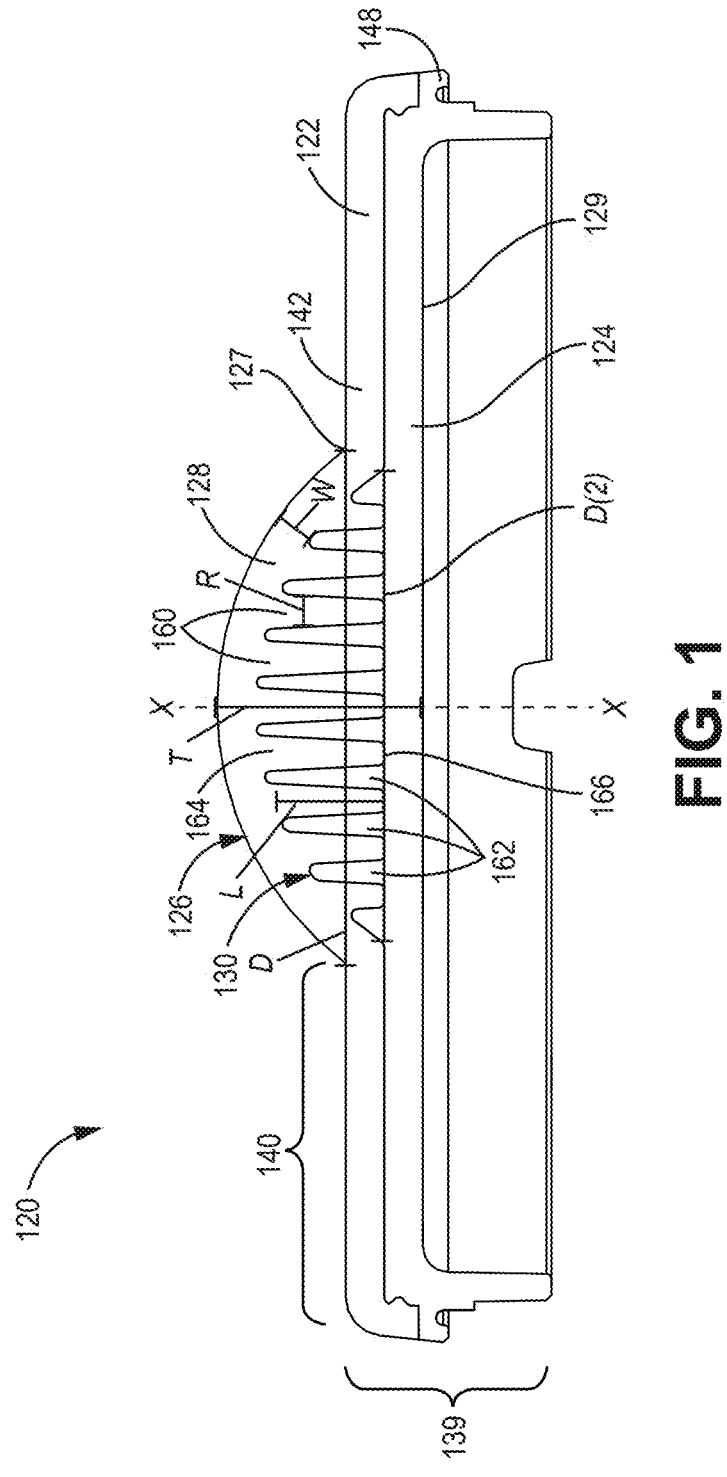
FIG. 1 is a cross-sectional view of a lens consistent with the present technology.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION

The current disclosure is generally directed to a lens assembly that may advantageously have a lens thickness conducive to increased power and/or focus of signal beams conducted through the lens. Additionally, the lens assembly may advantageously be manufactured using a molding process and may use an overmolding process (e.g., a first molding process forming a first portion and a second molding process forming a second portion onto the formed first portion). Such an overmolding process may reduce cost and labor associated with manufacturing such lens assemblies. Furthermore, lens systems consistent with the technology disclosed herein may be manufactured with standard bulk or thin-film LEDs and/or sensor(s) and may further advantageously reduce or eliminate water ingress into the system. It is understood that the lenses described herein may be used in a variety of applications, including radar sensor systems, imaging, magnification, other signal transmission systems besides radar, etc.

Definitions

"Optical axis" is defined as the central axis, x, through a lens.

"Axial direction" is the direction parallel to the optical axis x.

"Lateral direction" encompasses the directions in a plane perpendicular to the optical axis x.

In general, manufacturing lenses of any thickness requires either expensive machining of a singular lens component, or requires a molding process (e.g., injection molding, etc.) that requires a cooling period for the material to cool in the molded shape. As the lens thickness increases, the cooling period becomes longer. A longer cooling period can result in warping of the material as it sets over time. Also, molded components having relatively large variations in thickness can result in variations in cooling time, which may lead to warping. Warping can result in a lens having an unpredictable shape, leading to unusable lenses or lenses that are not optimal in various applications. Additionally, warping can cause the lens to have a sub-optimal fit with mating parts or can cause seal failure in applications with seals as described herein. The present disclosure describes, in part, an overmolding process such that material is molded and cooled, and then additional material is molded and cooled. The material(s) can cool faster after each of the molding processes because there is less material that needs to be cooled at each step of the process. Conversely, a single-shot molding process to manufacture a relatively thicker lens requires a longer cooling time and an increased chance of lens warping.

Figure 3:
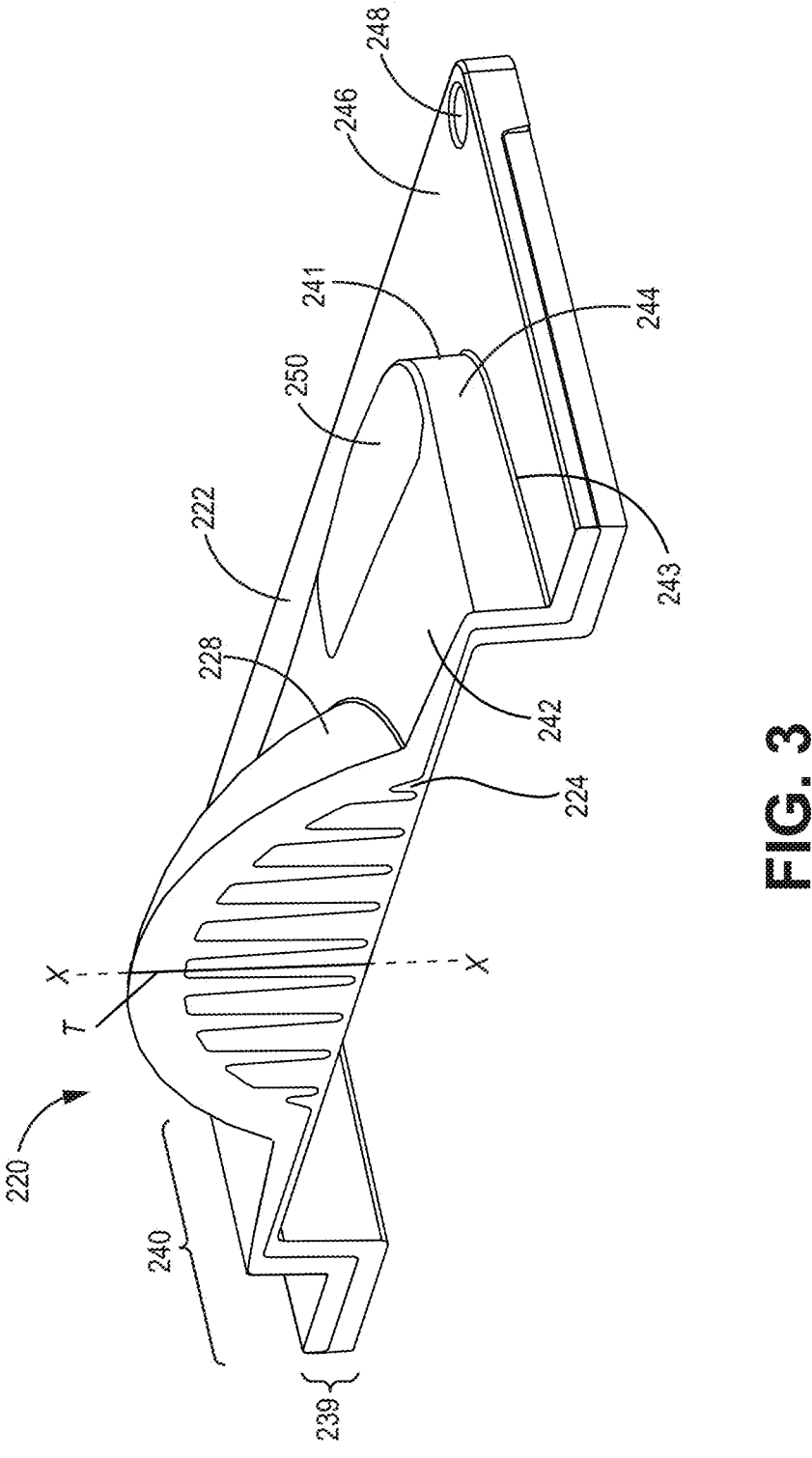
FIG. 3 is a perspective cross-sectional view of a lens consistent with the present technology.
Figure 4:
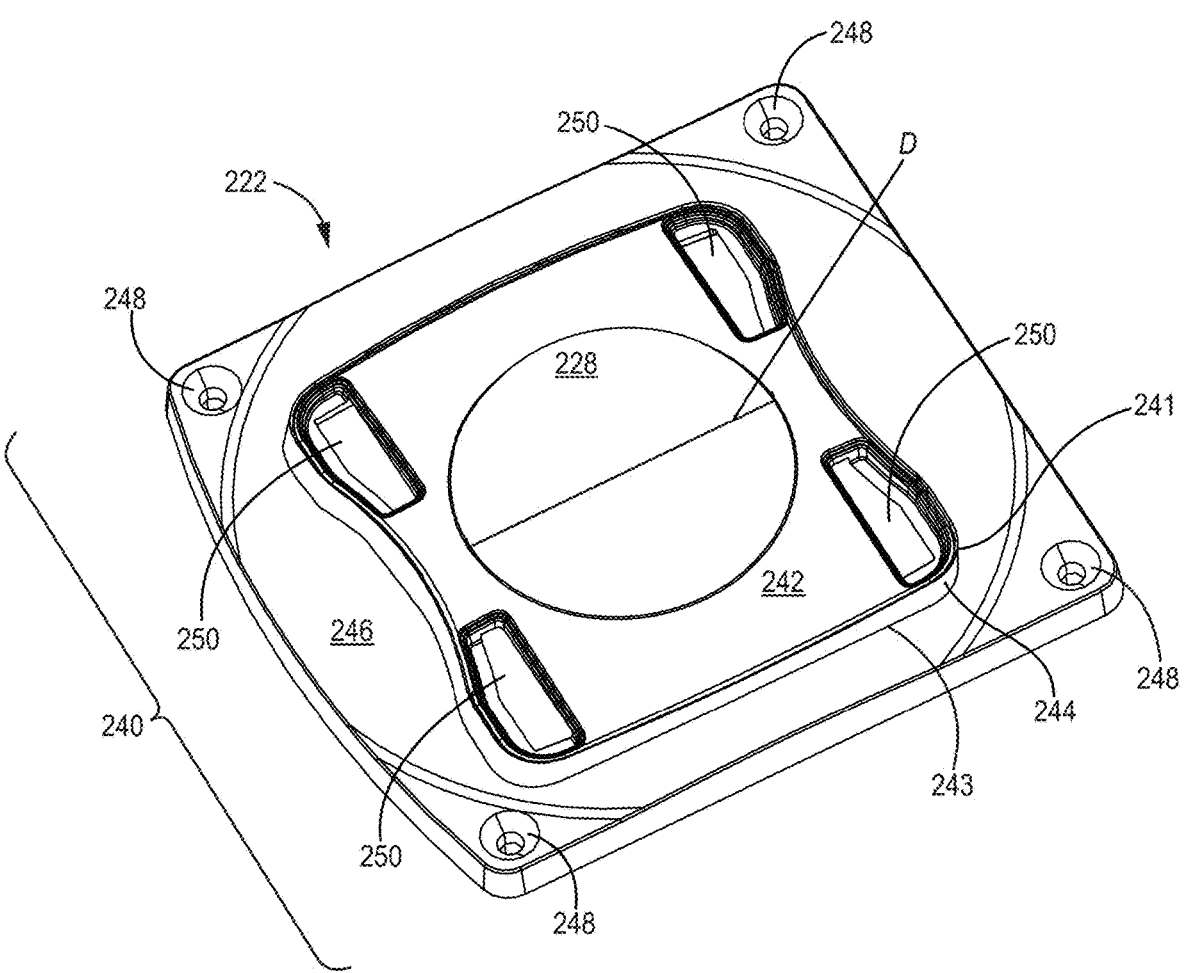
FIG. 4 is a perspective view of a lens base consistent with some embodiments.

An example lens assembly 120 (as used in any system or application, such as the example system of FIG. 4, described further herein) is illustrated in FIG. 1, and may include a lens base 122 and a lens fill 124. It will be understood the components referenced in the description of FIGS. 1-2 herein are consistent with the descriptions of the same components described elsewhere herein (e.g., FIGS. 3-5, FIGS. 6-7, etc.) unless contradictory to the current description or corresponding figures. Using an overmolding process, one molding process each for the lens base 122 and the lens fill 124, can advantageously allow for the manufacture of relatively thicker lenses that do not warp or sink. More specifically, using an overmolding process can avoid warping of the lens assembly 120 along an exterior surface 126 of a convex lens 128, along an interior surface 130 of the lens assembly 120, and/or within the lens assembly 120.

Such an overmolding process can advantageously provide the lens assembly 120 with a lens thickness, T, between about 1 millimeter (mm) and 100 mm. The lens base 122 can include a portion of the convex lens 128. The convex lens 128 may define an optical axis, x. The lens thickness T may be defined as the distance from a lens outer surface 126 of the convex lens 128 to a lens inner surface 129 along the optical axis x. In one embodiment, the lens thickness Tis about 40 mm. In alternative embodiments, the lens thickness Tis equal to or greater than 5 mm, 10 mm, 15 mm, 20 mm, 25 mm, 30 mm, 35 mm, 40 mm, 45 mm, 50 mm, etc., or less than or equal to 55 mm, 50 mm, 43 mm, 38 mm, 33 mm, 28 mm, 23 mm, 18 mm, 13 mm, 8 mm, 3 mm, etc.

The overmolding process can also advantageously provide the lens assembly 120 with a lens maximum cross dimension, D. The lens maximum cross dimension D may refer to the maximum measurement in the lateral direction across the lens outer perimetric boundary 127. In some embodiments the lens maximum cross dimension defines a diameter, but in other embodiments the lens maximum cross dimension defines a diagonal measurement. The lens maximum cross dimension D may be between about 1 mm and about 100 mm. In one embodiment, the lens maximum cross dimension D is about 40 mm. In alternative embodiments, the lens maximum cross dimension D is equal to or greater than 5 mm, 10 mm, 15 mm, 20 mm, 25 mm, 30 mm, 35 mm, 40 mm, 45 mm, 50 mm, etc., or less than or equal to 100 mm, 95 mm, 90 mm, 85 mm, 80 mm, 75 mm, 70 mm, 65 mm, 60 mm, 55 mm, 50 mm, etc.

The lens base 122 and the lens fill 124 may be constructed of the same or different materials. The lens base 122 and the lens fill 124 may be constructed using materials of the same or different colors. In some embodiments, the lens base 122 and the lens fill 124 may be constructed of materials having different transmission properties of particular wavelengths in the electromagnetic spectrum. In examples, the lens base 122 and the lens fill 124 may each be constructed of, or may each include, a plastic. Plastic can advantageously be used in molding processes as described herein with shorter cooling times, reduced cost of material, and detailed molding shapes. The plastic may include, for example, polycarbonate, acrylonitrile butadiene styrene (ABS), polypropylene or other thermoplastics, etc. In some examples, one or both of the lens base 122 and the lens fill 124 may include polycarbonate Makrolon® 2407 (supplied by company Covestro AG, with a principal place of business in Leverkusen, Germany). In alternative embodiments, the lens base 122 and/or the lens fill 124 may be constructed of, or may each include, other plastics, glasses, or any combination thereof. Various materials can provide different advantages for different lens applications (e.g., glass may be advantageous for magnification lenses, plastic and glass combinations can be advantageous for imaging applications, plastics can be advantageous for outdoor UV and ozone resistance, plastic can be advantageously less expensive per unit weight and does not need to be baked into a kiln and can be easier to machine and more impact resistant than various materials such as ceramics or metals, etc.).

Figure 2:
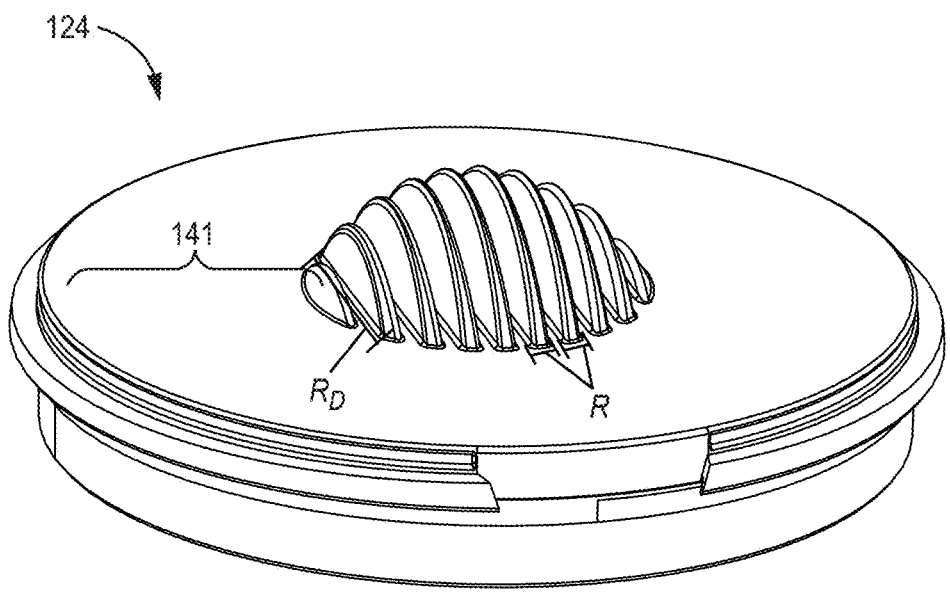
FIG. 2 is a is a perspective view of a lens base of FIG. 1.

The lens assembly 120 may be shaped such that the outer surface 126 of the convex lens 128 is aspherical, domed, a spherical cap, a hemisphere (e.g., a half-sphere), etc. The convex lens 128 may be optimized for specific applications. The lens base 122 and the lens fill 124 may further be shaped such that the lens assembly 120 has a cross-section through a lateral plane that is circular (FIGS. 1-2). In alternative embodiments, the lens base and the lens fill may further be shaped such that the lens has a cross-section through a lateral plane that is square (FIGS. 3-5), or any other shaped plan view (e.g., rectangular, hexagonal, ovular, etc.).

In embodiments where the outer surface 126 of the convex lens is a spherical cap or a hemisphere, the lens assembly 120 defines a lens spherical diameter, Ds. The spherical diameter Ds may refer to the diameter of the imaginary sphere that the outer surface of the spherical lens defines a portion of. The spherical diameter Ds may be between about 6 mm and about 200 mm. In one embodiment, the spherical diameter Ds is about 100 mm. In alternative embodiments, the spherical diameter Ds is equal to or greater than 5 mm, 10 mm, 15 mm, 20 mm, 25 mm, 30 mm, 35 mm, 40 mm, 45 mm, 50 mm, 75 mm, 100 mm, 125 mm, 150 mm, 175 mm, 200 mm, etc., or less than or equal to 190 mm, 160 mm, 140 mm, 120 mm, 105 mm, 100 mm, 95 mm, 90 mm, 85 mm, 80 mm, 75 mm, 70 mm, 65 mm, 60 mm, 55 mm, 50 mm, etc.

Each of the lens base 122 and the lens fill 124 will now be discussed in further detail. FIG. 2 is a perspective views of the lens base 122 consistent with some embodiments. The lens base 122 may be constructed of, or may include, a single material. In alternative embodiments, the lens base 122 may be constructed of, or may include, multiple materials (e.g., the lens base 122 may be constructed of a polycarbonate material which may include a separate colorant, etc.).

The lens base 122 can define a portion of the convex lens 128 (FIG. 1). The convex lens 128 is generally configured to accommodate the transmission of electromagnetic waves. The convex lens may define the optical axis, x. The lens base 122 may further include a portion of a flange 140 (the lens base 122 and lens fill 124 together may include a flange 139). The flange 139 can be configured to couple the lens assembly 120 to another object (e.g., the housing 312 of FIG. 6). The portion of the flange 140 is shown in FIG. 1 with a first lateral extension 142 that extends laterally from the convex lens 128 at the lens outer perimetric boundary

127 of the convex lens. In embodiments incorporating a flange 139, the portion of the flange 140 and the portion of the convex lens 128 defined by the lens base 122 can be formed in a single molding operation to define an integral, unitary component.

Figure 5:
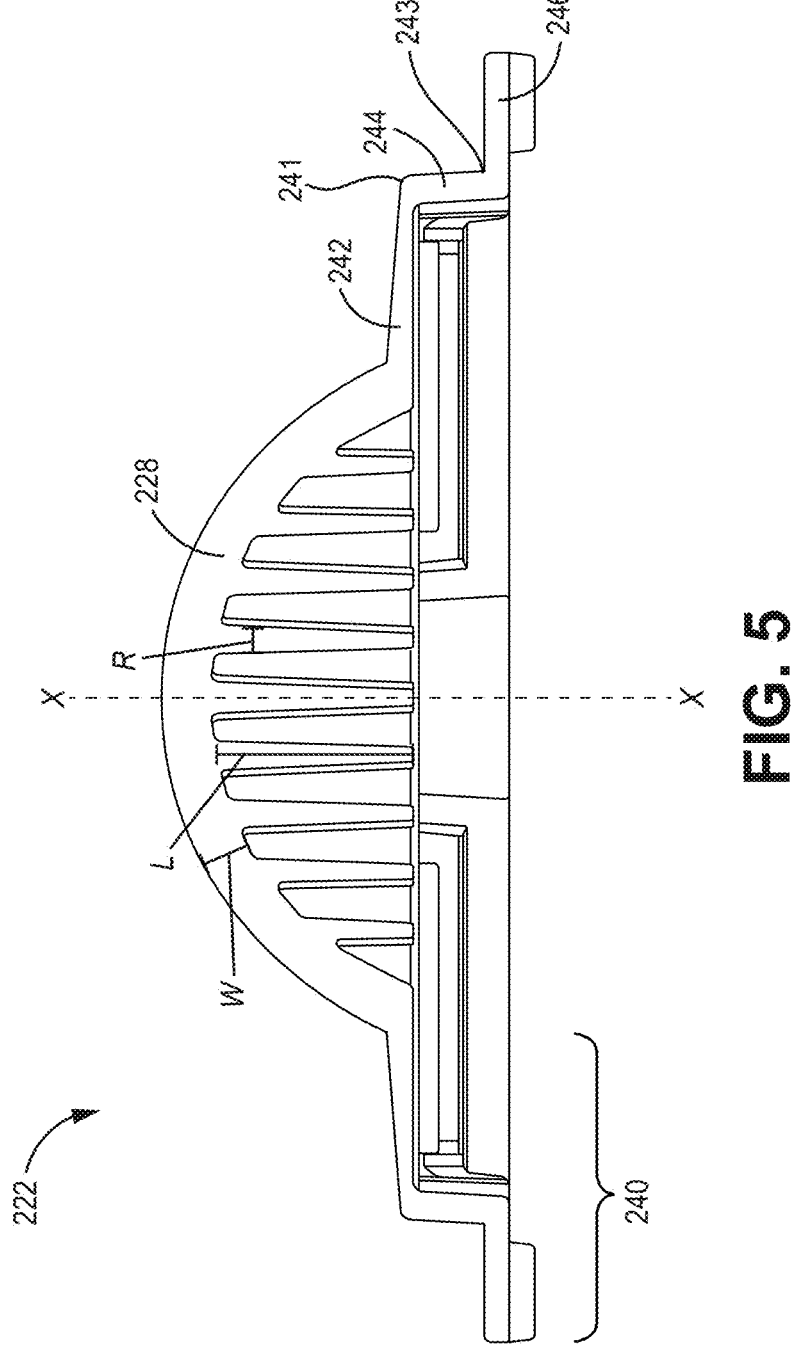
FIG. 5 is a cross-sectional view of the lens base of FIG. 4.
Figure 6:
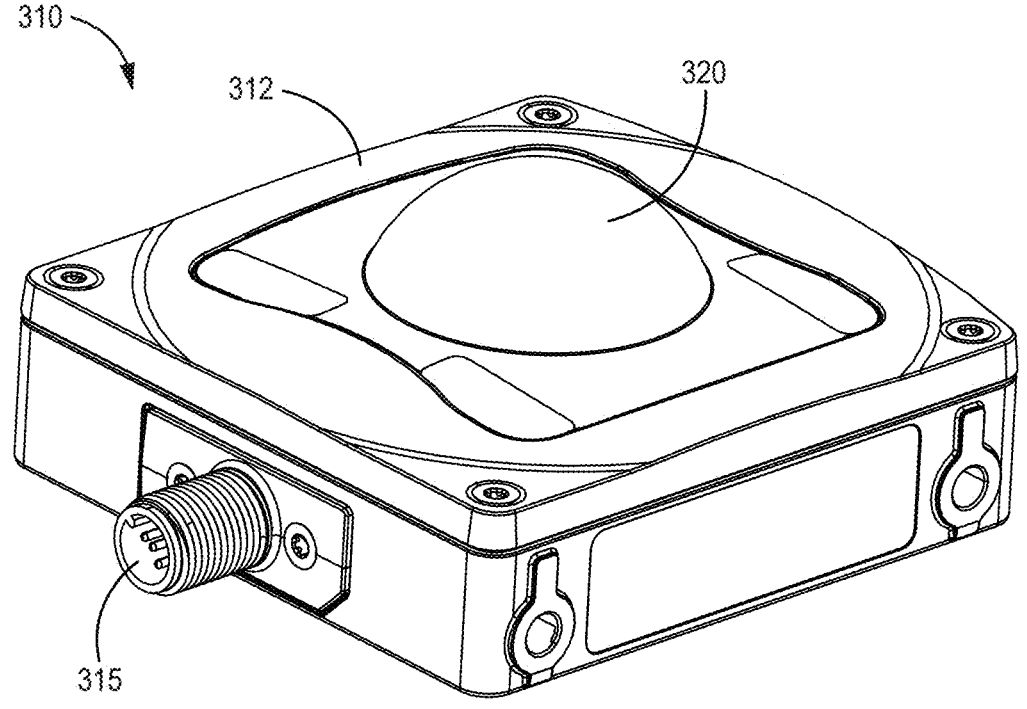
FIG. 6 is a perspective view of a lens system.

The flange 140 as shown in FIGS. 1-2 also includes at least one mounting structure 148 that is configured to couple to another object (e.g., the housing 312 of FIG. 6). The mounting structure 148 can be a variety of different structures and combinations of structures including circumferential threading, a bayonet connector, a surface configured to receive an adhesive or weld, a snap fit structure, or the like. In the current example the mounting structure 148 includes a snap fit structure (FIGS. 1-2), or includes mounting hole(s) (FIGS. 3-5) as discussed further herein.

In alternative embodiments, the flange 140 may not include the lateral extension 141, and/or the mounting structure 148 as described herein in order to be optimized for a variety of applications and/or manufacturing processes. The flange 140 may include additional lateral and axial extensions to be optimized for a variety of applications and/or manufacturing processes. The flange 140 may be formed into a variety of shapes (e.g., circular, rectangular, triangular, hexagonal, cylindrical, cuboid, pyramidal, etc.) to be optimized for a variety of applications and/or manufacturing processes.

The lens base 122 can define a plurality of ribs 160 (FIG. 1). The ribs 160 can advantageously provide increased structural stability to the lens base 122 during, for example, molding processes described herein. In various embodiments, the ribs 160 define a structural framework for a relatively thick lens assembly while limiting warping following a molding operation compared to molding a lens assembly with the same thickness in a single molding operation. The lens base 122 can define the lens interior surface 130 (FIG. 1) extending along an interior surface of the convex lens 128. The ribs 160 can extend axially from the lens interior surface 130. The ribs 160 can define a plurality of cavities 162 between the plurality of ribs 160. The ribs 160 can also extend laterally across at least a portion of a lens inner base cross dimension, D(2), of the lens interior surface 130.

The lens inner base cross dimension D(2) may refer to the measurement in the lateral direction across an inner surface of the lens base 122 that forms an outer perimetric boundary of the interior surface 130. In some embodiments the lens inner base cross dimension D(2) defines a diameter, but in other embodiments the lens inner base cross dimension D(2) defines a diagonal measurement. The lens inner base cross dimension D(2) may be between about 1 mm and about 100 mm. In one embodiment, the lens inner base cross dimension D(2) is about 40 mm. In alternative embodiments, the lens inner base cross dimension D(2) is equal to or greater than 5 mm, 10 mm, 15 mm, 20 mm, 25 mm, 30 mm, 35 mm, 40 mm, 45 mm, 50 mm, etc., or less than or equal to 100 mm, 95 mm, 90 mm, 85 mm, 80 mm, 75 mm, 70 mm, 65 mm, 60 mm, 55 mm, 50 mm, etc.

Additionally, the convex lens 128 can define a lens base wall thickness, W (FIG. 1). The lens base wall thickness W can be defined by the lens interior surface 130 and the lens exterior surface 126 in the radial direction. In some embodiments, the lens base wall thickness W can be constant along the entirety of the convex lens 128 (defining the lens base wall thickness W without the ribs), where "constant" is used to encompass deviations of 5%, 4%, 3%, 2% or 1% in the lens base wall thickness. In alternative embodiments, the lens base wall thickness W is not constant.

The lens base wall thickness W can be between about 0.5 mm and about 5 mm. In various embodiments the range of the lens base wall thickness W is dictated by the particular material used to mold the lens base wall which are generally known in the art. For example, the range of the lens base wall thickness W for polycarbonate may be between about 0.040 inches and about 0.150 inches. Further, for example, the range of the lens base wall thickness W for ABS may be between about 0.045 inches and about 0.140 inches. Further, for example, the range of the lens base wall thickness W for polypropylene may be between about 0.025 inches and about 0.150 inches. In embodiments, the lens base wall thickness W is about 4 mm. In alternative embodiments, the lens base wall thickness W is equal to or greater than 1 mm, 2 mm, 3 mm, 4 mm, 5 mm, etc., or less than or equal to 5 mm, 4.5 mm, 3.5 mm, 2.5 mm, 1.5 mm, 0.5 mm, etc.

The plurality of ribs 160 can each define a rib length, L (FIG. 1). The rib length L is defined in the axial direction. The rib length L can be less than the lens thickness T. The plurality of ribs 160 can each define a rib depth, $R_D$ (FIG. 2). The rib depth $R_D$ may be defined as the distance of the rib that extends across the lens assembly 120 in the lateral direction, as measured along a plane transverse to the optical axis x. The plurality of ribs 160 can each define a rib thickness, R (FIGS. 1-2). The rib thickness R may be defined as the width of a rib of the plurality of ribs 160 as measured along a plane transverse to the optical axis x and perpendicular to the rib depth $R_D$. The rib depth $R_D$ may be greater than the rib thickness R. In some embodiments, the rib depth $R_D$ is greater than twice the rib thickness R, greater than three times the rib thickness R, greater than five times the rib thickness R, etc. The maximum rib depth $R_D$ is generally less than the lens maximum cross dimension D. The rib thickness R can decrease along the rib length L from a first rib end 164 proximate the lens interior surface 130 to a rib second end 166 distal from the lens interior surface 130. Decreasing the rib thickness R along the rib length Z can advantageously decrease the cooling time required as the thickness decreases (compared to a constant rib thickness R), can aid in ejection of the lens part from a molding tool and avoid damage by decreasing any friction between the tool and the part, and can minimize the amount of material required for the lens base 122. Minimizing a mass of the rib(s) 160 can further advantageously avoid sinking on the surface of the lens assembly 120. In alternative embodiments, the rib thickness R may be constant, which can advantageously minimize the amount of material required for the lens fill 124.

In various embodiments, the rib thickness R is between about 40% and about 60% of the lens base wall thickness W. The rib thickness R between about 40% and about 60% of the lens base wall thickness W can provide structural support to the convex lens 128 and can avoid lens warping and other cosmetic and dimensional defects.

The lens fill 124 is molded to the lens base 122 to form the lens assembly 120. The lens fill 124 (FIG. 1) can be located within the plurality of cavities 162. The lens fill 124 can be molded in or on to the lens base 122 after molding the lens base 122 after which lens base 122 has sufficiently cooled. Alternately, the lens base 122 can be molded in or onto the lens fill 124 after molding the lens fill 124 after which the lens fill 124 has sufficiently cooled. The lens fill 124 can be constructed of materials consistent with those used to construct the lens base 122 described elsewhere herein. In one or more embodiments, the lens fill 124 may be constructed of a polycarbonate material which may include a colorant (e.g., a translucent white colorant, etc.) or lack a colorant. In embodiments, the lens fill 124 may be constructed of, or may include, multiple materials, The lens base 122 and the lens fill 124 may be structurally bonded to one another at any point where the lens base 122 and the lens fill 124 are in contact with one another, as described herein with respect to the overmolding process. Such bonding of the lens base 122 and the lens fill 124 can define a singular lens assembly 120 having a relatively thick thickness while advantageously avoiding warping typically resulting from molding a relatively thick component or a component that has relatively large variations in thicknesses.

As described herein, the lens base 122 may be constructed of a first material and the lens fill 124 may be constructed of a second material, which may be the same or different than the first material. In one or more embodiments, the first material may be a composition of one or more components. In one or more embodiments, the second material may be a composition of one or more components. In one or more embodiments, the first material may define a first color and the second material may define a second color that is different from the first color. In some embodiments, the lens base 122 is constructed of a thermoplastic having a first color and the lens fill 124 is constructed of a similar or different thermoplastic having a second color. In some embodiments the lens base is constructed of polycarbonate having a first colorant and the lens fill is constructed of polycarbonate having either (1) a second colorant or (2) no colorant. In a specific example, the first material may include Makrolon® 2407-901510 (supplied by Covestro AG, with a principal place of business in Leverkusen, Germany), which is black, and the second material may include Makrolon® 2407-021069 (supplied by Covestro AG, with a principal place of business in Leverkusen, Germany), which is translucent white. In alternative embodiments, the first material and the second material may each include any known color and any known opacity, and may be optimized for any application of the lens assembly 120. For example, in some embodiments the second material is optically translucent and the first material is not optically translucent. Further, for example, in some embodiments the second material is not optically translucent and the first material is optically translucent. In examples where the second material is optically translucent, the second material may selectively accommodate optical transmission through the assembly defined only by the optically translucent layer, which has been discussed elsewhere herein. Additionally, in one or more embodiments, the first and second materials can facilitate transmission of electromagnetic waves in a particular wavelength (e.g., radar).

In one or more embodiments, the convex lens 128 can be configured to transmit between about 50 gigahertz (GHz) and about 75 GHz electromagnetic waves. This may advantageously allow for use of the lens assembly 120 with any applications using electromagnetic waves (e.g., radar sensing). In alternative embodiments, the convex lens 128 can be configured to transmit electromagnetic waves greater than or equal to 10 GHz, 20 GHz, 30 GHz, 40 GHz, 50 GHz, 60 GHz, 70 GHz, 80 GHz, 90 GHZ, 100 GHz, etc., or less than or equal to 105 GHz, 95 GHz, 85 GHz, 75 GHz, 65 GHz, 55 GHz, 45 GHz, 35 GHz, 25 GHz, 15 GHz, 5 GHz, 1000 megahertz (MHz), 500 MHz, 100 MHz, 50 MHz, 5 MHz, etc. In further alternative embodiments, the convex lens 128 can be configured to transmit low-frequency waves (e.g., millimeter waves).

FIGS. 3-5 illustrate another embodiment of a lens assembly 220. It will be understood the components referenced in the description of FIGS. 1-2 herein are consistent with the descriptions of the same components described elsewhere herein (e.g., FIGS. 3-5, FIGS. 6-7, etc.) unless contradictory to the current description or corresponding figures. For example, the portion of the flange 240 as shown in FIGS. 3-5 also includes an axial extension 244 that extends from an end 241 of the first lateral extension 242 in an axial direction away from the lens assembly 220. The portion of the flange 240 as shown in FIGS. 3-5 also includes a second lateral extension 246 that extends in a lateral direction outward from an end 243 of the axial extension 244.

Additionally, the flange 240 as shown in FIGS. 3-5 also includes at least one window 250. The window(s) can advantageously provide an area of the lens base 222 that allows particular wavelengths of electromagnetic radiation to pass therethrough such as, in some implementations, visible light. Such window(s) 250 can be used, for example, to allow for visual indication of a measured output of the signal transmitted through the lens (e.g., a light may turn on or off when a vehicle gets within a certain distance of the lens assembly 220, when the level of a solid or liquid in a tank falls below a certain level, etc.).

As illustrated in FIGS. 3-5, the mounting structure(s) 248 includes mounting holes. In embodiments with mounting holes, the mounting holes may be threaded or may be through-holes configured to receive a fastener such as a rivet, screw, bolt, or the like.

In alternative embodiments, the flange 240 may not include each of, or any of, the lateral and axial extensions 242, 244, 246, the window(s) 250, and/or the structures 248 as described herein in order to be optimized for a variety of applications and/or manufacturing processes. The flange 240 may include additional lateral and axial extensions to be optimized for a variety of applications and/or manufacturing processes. The flange 240 may be formed into a variety of shapes (e.g., circular, rectangular, triangular, hexagonal, cylindrical, cuboid, pyramidal, etc.) to be optimized for a variety of applications and/or manufacturing processes.

FIG. 6 is a perspective view of a lens system 310 with a lens assembly 320. The lens system 310 includes a housing 312, a connector 315, and the lens assembly 320. The lens system 310 can be used to, for example, implement collision avoidance, sense the level of a liquid or solid in a container, direct vehicles to available parking, detect objects, monitor arrival and departure of objects, measure distance, etc. The housing 312 is generally configured to contain internal components described herein. The connector 315 is generally configured to provide an electrical and/or data connection to a power source, computing apparatus, etc., to enable a user to receive data from the lens system 310. In the current example the connector 315 is threaded, but other types of connections can certainly be employed.

Figure 7:
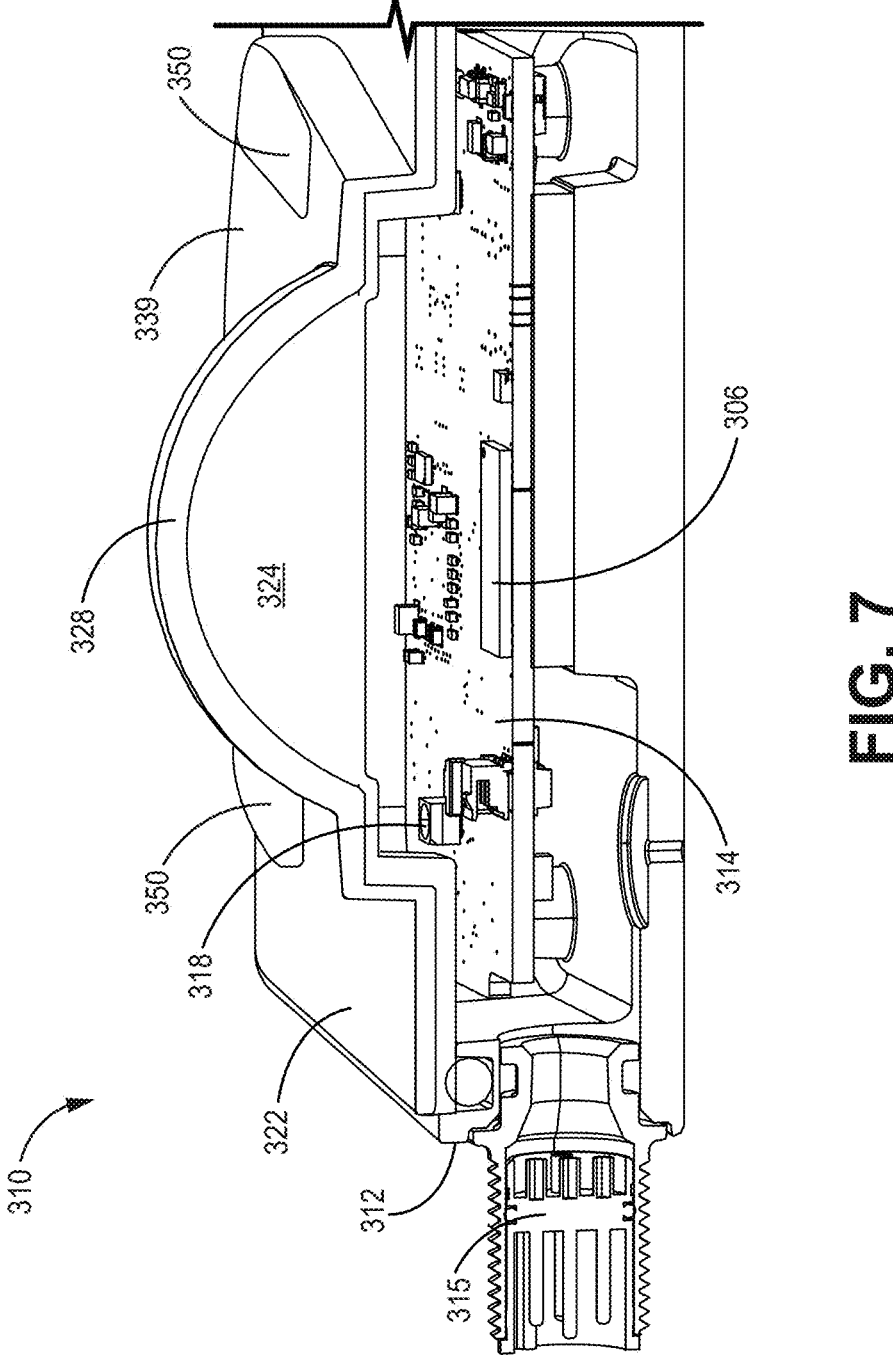
FIG. 7 is a perspective enlarged cross-sectional view of the system of FIG. 6.

FIG. 7 is a perspective enlarged cross-sectional view of the lens system 310 of FIG. 6. The system 310 illustrates the lens assembly 320, the housing 312, and further shows a printed circuit board (PCB) 314, a sensor 306, and at least one light emitting device 318.

The PCB 314 is generally configured to provide electronic and/or data communication among various components of the system 310. The PCB 314 can be coupled to the housing 312. The PCB 314 is disposed in the housing 312, in various examples. The PCB 314 can generally be consistent with printed circuit boards known in the art.

The light emitting device(s) 318 can be generally configured to emit light. The light emitting device(s) 318 can be coupled to the PCB 314. The light emitting device(s) 318 can be disposed in the housing 312. The light emitting device(s) 318 can be located proximate the at least one window 350. The light emitting device(s) 318 can be positioned to transmit light through the at least one window 350. The at least one window 350 can be configured to transmit light through the at least one window 350. The light emitting device(s) may be used, for example, to advantageously provide visual indicator(s). Visual indicator(s) may be used to indicate that a sensed signal is within or beyond a threshold. A visual indicator can be used, for example, to indicate object detection, material level in a container falling or rising above a threshold, etc. In one or more embodiments, the lens fill 224, 324 extends across the window 250, 350 and transmits light therethrough. In one or more embodiments, the lens base 222, 322 extends across the window 250, 350 and transmits light therethrough.

The light emitting device(s) 318 can be consistent with various light emitting devices known in the art. In some examples the light emitting device(s) 318 are one or more light emitting diodes (LEDs). In some examples the LED is a standard bulk or thin-film surface mount technology (SMT) LED. In such an example, the light emitting device(s) 318 can be mounted to an LED substrate, which is mounted to the PCB 314. The light emitting device(s) 318 can be configured to emit light in an axial direction parallel to the optical axis x.

The lens system 310 may further include a sensor 306. The sensor 306 can be configured to sense a signal, for example, a light signal, a radar signal, etc., and may include a photoelectric sensor, an ultrasonic sensor, a radar sensor, a proximity sensor, an infrared sensor, etc. In embodiments including a radar sensor, the sensor 306 can advantageously sense radar signals for various applications as described herein. The sensor 306 can be located proximate the convex lens 328 along the optical axis x (e.g., proximate a center of a base of the convex lens).

Overmolding the lens fill 324 and the lens base 322 can effectively avoid water ingress into the housing 312. For example, the lens fill 324 may be molded to the lens base 322 such that the lens fill 324 extends across the at least one window 350. In embodiments using the lens assembly 220 with the system 310, the lens fill 224 may be molded to the lens base 222 such that the lens fill 224 extends across the at least one window 250. Integrally forming the lens fill 224, 324 and the lens base 222, 322 to define the flange 239, 339 having the at least one window 250, 350 and convex lens 228, 328 in this process may advantageously create a seal that prevents the entry of water or other outside contaminants through the lens assembly 220, 320. Such a configuration reduces the number of additional seals required in the overall system. Each seal (e.g., adhesive seals, mechanical seals, etc.) introduces possible locations of failure with respect to water ingress. Some existing technologies include components such as windows and lenses that are formed individually and then separately coupled to form the system, where each separate coupling requires an additional seal. Further, the lens fill 124, 224, 324 may be configured to extend across or around various components of the housing 312, or across or around the entire housing 312, to create a seal that prevents the entry of water or other outside contaminants into the housing 312 or onto an inner surface of the lens assembly 120, 220, 320, which may protect various components of the lens system 310.

The Manufacturing Process

Figure 8:
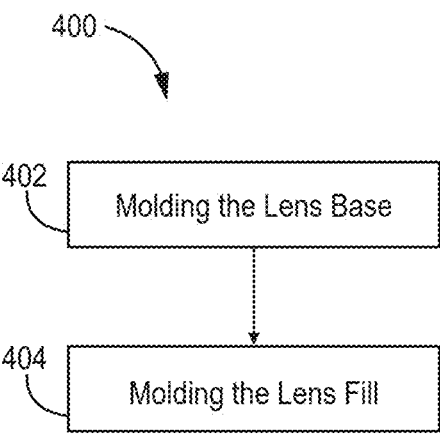
FIG. 8 is a flowchart method of manufacturing the lens consistent with the present technology.

Molding processes can advantageously provide a faster, lower cost manufacturing process. FIG. 8 illustrates a method 400 of manufacturing a lens (e.g., the lens assembly 120, 220, 320). The method 400 includes molding a lens base having a lens interior surface and a plurality of ribs extending axially from a lens interior surface using a first material (each component as described herein), illustrated as reference number 402. The plurality of ribs can define a plurality of cavities between the plurality of ribs as described herein.

The method 400 may further include molding a lens fill to the lens base. The lens fill can be molded to the lens base within the plurality of cavities using a second material (each component as described herein), illustrated as reference number 404. In alternative embodiments (not shown), the method 400 may include first molding the lens fill, and may further include molding the lens base to the lens fill. Molding the lens base and molding the lens fill may occur at different times (i.e., one occurs before the other), which can advantageously allow the first part to cool sufficiently to avoid warping before the second part is molded. Additionally, such an overmolding process can advantageously reduce the manufacturing time and cost, at least because each part may cool faster and the materials used may be optimized for specific lenses and for cost.

Molding the lens base can include molding a convex lens and a flange extending laterally from the convex lens (each component as described herein). Molding the lens base can define a lens thickness T, and further can define a lens base wall thickness W, each as described herein.

Statement of the Exemplary Embodiments

Embodiment 1

A lens assembly comprising:

a lens base constructed of a first material, wherein the lens base defines a lens interior surface and a plurality of ribs extending axially from the lens interior surface, wherein the plurality of ribs define a plurality of cavities between the plurality of ribs; and a lens fill constructed of a second material, wherein the lens fill is located within the plurality of cavities, wherein the first material comprises a plastic and the second material comprises a plastic Embodiment 2

The lens assembly of any one of embodiments 1 and 3-23, wherein the lens base comprises a convex lens and a flange extending laterally from the convex lens.

Embodiment 3

The lens assembly of any one of embodiments 1-2 and 4-23, wherein the first material defines a first color and the second material defines a second color that is different from the first color.

Embodiment 4

The lens assembly of any one of embodiments 1-3 and 5-23, wherein the lens base defines a lens thickness greater than or equal to 3 millimeters (mm) and less than or equal to 50 mm.

Embodiment 5

The lens assembly of any one of embodiments 1-4 and 6-23, wherein each of the plurality of ribs defines a rib length, and wherein the rib length is less than or equal to the lens thickness.

Embodiment 6

The lens assembly of any one of embodiments 1-5 and 7-23, wherein the lens base defines a lens base wall thickness defined by the lens interior surface and a lens exterior surface, and wherein the lens base wall thickness is less than or equal to 5 mm.

Embodiment 7

The lens assembly of any one of embodiments 1-6 and 8-23, wherein each of the plurality of ribs defines a rib thickness, and wherein the rib thickness is at least 25% of the lens base wall thickness.

Embodiment 8

The lens assembly of any one of embodiments 1-7 and 9-23, wherein each of the plurality of ribs tapers from a rib first end proximate to the lens interior surface to a rib second end distal from the lens interior surface.

Embodiment 9

The lens assembly of any one of embodiments 1-8 and 10-23, wherein the convex lens is configured to transmit less than or equal to 120 GHz electromagnetic waves.

Embodiment 10

The lens assembly of any one of embodiments 1-9 and 11-23, wherein the lens base further comprises a flange, and wherein the flange defines at least one window.

Embodiment 11

A method of making a lens comprising: molding a lens base having a lens interior surface and a plurality of ribs extending axially from the lens interior surface using a first material, wherein the plurality of ribs define a plurality of cavities between the plurality of ribs; and molding a lens fill within the plurality of cavities using a second material.

Embodiment 12

The method of any one of embodiments 1-11 and 13-23, wherein molding the lens base comprises molding a convex lens and a flange extending laterally from the convex lens.

Embodiment 13

The method of any one of embodiments 1-12 and 14-23, wherein the first material defines a first color and the second material defines a second color that is different from the first color.

Embodiment 14

The method of any one of embodiments 1-13 and 15-23, wherein molding the lens base defines a lens thickness, and wherein the lens thickness is greater than or equal to 3 millimeters (mm) and less than or equal to 50 mm.

Embodiment 15

The lens of any one of embodiments 1-14 and 16-23, wherein each of the plurality of ribs defines a rib length, and wherein the rib length is less than or equal to the lens thickness.

Embodiment 16

The method of any one of embodiments 1-15 and 17-23, wherein molding the lens base defines a lens base wall thickness defined by the lens interior surface and a lens exterior surface, and wherein the lens base wall thickness is less than or equal to 5 mm.

Embodiment 17

The method of any one of embodiments 1-16 and 18-23, wherein each of the plurality of ribs defines a rib thickness, and wherein the rib thickness is at least 25% of the lens base wall thickness.

Embodiment 18

The method of any one of embodiments 1-17 and 19-23, wherein each of the plurality of ribs tapers from a rib first end proximate to the lens interior surface to a rib second end distal from the lens interior surface.

Embodiment 19

The method of any one of embodiments 1-18 and 20-23, wherein the lens is configured to transmit less than or equal to 120 GHz electromagnetic waves.

Embodiment 20

A radar lens system comprising:

a lens base constructed of a first material, wherein the lens base comprises a convex lens and a flange extending laterally from the convex lens, wherein the convex lens defines a lens interior surface and a plurality of ribs extending axially from the lens interior surface, and wherein the plurality of ribs define a plurality of cavities between the plurality of ribs; and a lens fill constructed of a second material, wherein the lens fill is located within the plurality of cavities, and, wherein the flange defines at least one window and the lens fill extends across the at least one window.

Embodiment 21

The radar lens system of any one of embodiments 1-20 and 22-23, wherein the first material comprises a plastic and the second material comprises a plastic.

Embodiment 22

The radar lens system of any one of embodiments 1-21 and 23, further comprising a radar sensor located proximate a center of a base of the convex lens.

Embodiment 23

The radar lens system of any one of embodiments 1-22, further comprising a light emitting diode (LED) located proximate the at least one window, wherein the lens fill transmits light therethrough.

It should also be noted that, as used in this specification and the appended claims, the phrase "configured" describes a system, apparatus, or other structure that is constructed to perform a particular task or adopt a particular configuration. The word "configured" can be used interchangeably with similar words such as "arranged", "constructed", "manufactured", and the like.

All publications and patent applications in this specification are indicative of the level of ordinary skill in the art to which this technology pertains. All publications and patent applications are herein incorporated by reference to the same extent as if each individual publication or patent application was specifically and individually indicated by reference. In the event that any inconsistency exists between the disclosure of the present application and the disclosure(s) of any document incorporated herein by reference, the disclosure of the present application shall govern.

This application is intended to cover adaptations or variations of the present subject matter. It is to be understood that the above description is intended to be illustrative, and not restrictive, and the claims are not limited to the illustrative embodiments as set forth herein.

What is claimed is:

1. A lens assembly comprising:

a lens base constructed of a first material, wherein the lens base defines a lens interior surface and a plurality of ribs extending axially from the lens interior surface, wherein the plurality of ribs define a plurality of cavities between the plurality of ribs, wherein the lens base comprises a convex lens and a flange extending laterally from the convex lens, wherein the convex lens is configured to transmit less than or equal to 120 GHz electromagnetic waves; and a lens fill constructed of a second material, wherein the lens fill is located within the plurality of cavities, wherein the first material comprises a plastic and the second material comprises a plastic.

2. The lens assembly of claim 1, wherein the first material defines a first color and the second material defines a second color that is different from the first color.

3. The lens assembly of claim 1, wherein the lens base defines a lens thickness greater than or equal to 3 millimeters (mm) and less than or equal to 50 mm.

4. The lens assembly of claim 3, wherein each of the plurality of ribs defines a rib length, and wherein the rib length is less than or equal to the lens thickness.

5. The lens assembly of claim 1, wherein the lens base defines a lens base wall thickness defined by the lens interior surface and a lens exterior surface, and wherein the lens base wall thickness is less than or equal to 5 mm.

6. The lens assembly of claim 5, wherein each of the plurality of ribs defines a rib thickness, and wherein the rib thickness is at least 25% of the lens base wall thickness.

7. The lens assembly of claim 1, wherein each of the plurality of ribs tapers from a rib first end proximate to the lens interior surface to a rib second end distal from the lens interior surface.

8. The lens assembly of claim 1, wherein the lens base further comprises a flange, and wherein the flange defines at least one window.

9. A method of making a lens comprising:

molding a lens base having a lens interior surface and a plurality of ribs extending axially from the lens interior surface using a first material, wherein the plurality of ribs define a plurality of cavities between the plurality of ribs, wherein molding the lens base comprises molding a convex lens and a flange extending laterally from the convex lens, wherein the lens is configured to transmit less than or equal to 120 GHz electromagnetic waves; and molding a lens fill within the plurality of cavities using a second material.

10. The method of claim 9, wherein the first material defines a first color and the second material defines a second color that is different from the first color.

11. The method of claim 9, wherein molding the lens base defines a lens thickness, and wherein the lens thickness is greater than or equal to 3 millimeters (mm) and less than or equal to 50 mm.

12. The method of claim 11, wherein each of the plurality of ribs defines a rib length, and wherein the rib length is less than or equal to the lens thickness.

13. The method of claim 9, wherein molding the lens base defines a lens base wall thickness defined by the lens interior surface and a lens exterior surface, and wherein the lens base wall thickness is less than or equal to 5 mm.

14. The method of claim 13, wherein each of the plurality of ribs defines a rib thickness, and wherein the rib thickness is at least 25% of the lens base wall thickness.

15. The method of claim 9, wherein each of the plurality of ribs tapers from a rib first end proximate to the lens interior surface to a rib second end distal from the lens interior surface.

16. A radar lens system comprising:

a lens base constructed of a first material, wherein the lens base comprises a convex lens and a flange extending laterally from the convex lens, wherein the convex lens defines a lens interior surface and a plurality of ribs extending axially from the lens interior surface, and wherein the plurality of ribs define a plurality of cavities between the plurality of ribs; and a lens fill constructed of a second material, wherein the lens fill is located within the plurality of cavities, and, wherein the flange defines at least one window and the lens fill extends across the at least one window.

17. The radar lens system of claim 16, wherein the first material comprises a plastic and the second material comprises a plastic.

18. The radar lens system of claim 16, further comprising a radar sensor located proximate a center of a base of the convex lens.

19. The radar lens system of claim 16, further comprising a light emitting diode (LED) located proximate the at least one window, wherein the lens fill transmits light therethrough.

\* \* \* \* \*